W. A. STORK.
SELF BASTING ROASTER.
APPLICATION FILED MAY 1, 1913.
1,091,445.
Patented Mar. 24, 1914.
2 SHEETS—SHEET 1.
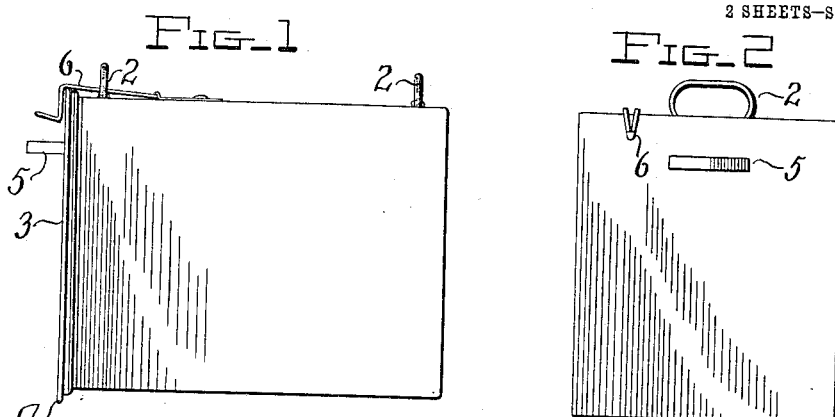
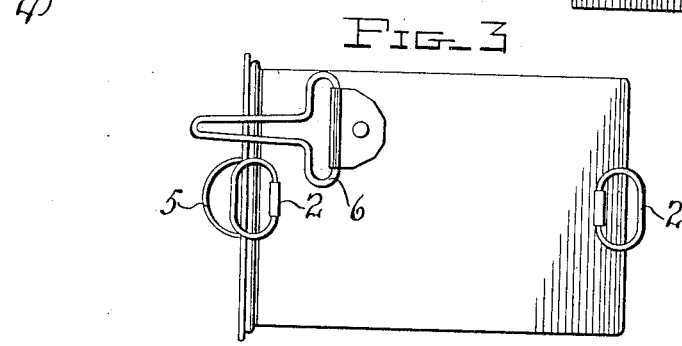
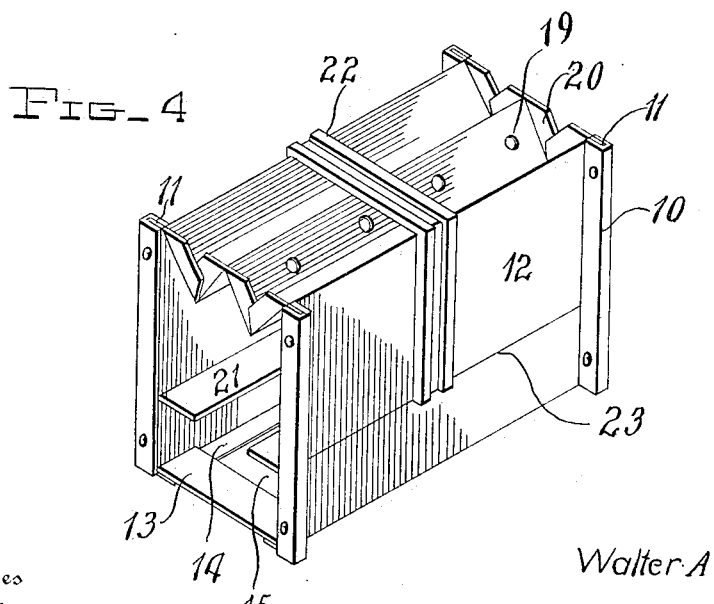
Witnesses
Charles H. Trotter
J. Ralph Hoge
Inventor
Walter A Stork
By H. B. Willson & Co
Attorneys

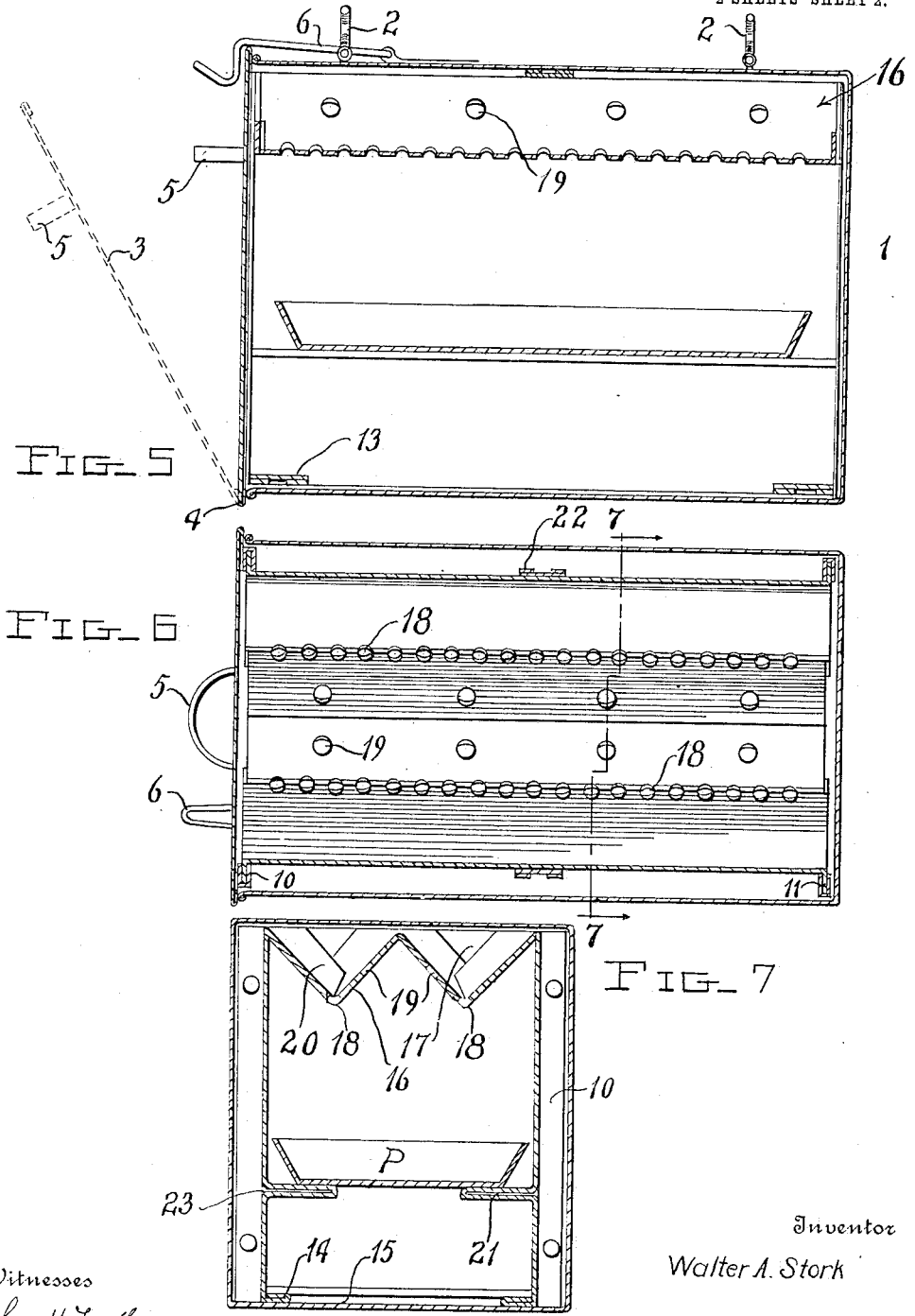

UNITED STATES PATENT OFFICE.

WALTER A. STORK, OF ST. LOUIS, MISSOURI.

SELF-BASTING ROASTER.

1,091,445.  Specification of Letters Patent.  Patented Mar. 24, 1914.

Application filed May 1, 1913. Serial No. 764,830.

*To all whom it may concern:*

Be it known that I, WALTER A. STORK, a citizen of the United States, residing at St. Louis city, in the State of Missouri, have invented certain new and useful Improvements in Self-Basting Roasters; and I do declare the following to be a full, clear, and exact description of the invention, such as will enable others skilled in the art to which it appertains to make and use the same.

This invention relates to domestic cooking utensils, and more especially to baking pans; and the object of the same is to produce a roasting device having an attachment whereby the food being baked or roasted will be automatically basted by the condensation of the vapors arising from its juices or the liquid in which it is roasted. This object is accomplished by the specific construction hereinafter more fully described and claimed, and as shown in the drawings wherein—

Figure 1 is a side elevation and Fig. 2 a front end elevation of this improved device as a whole, and Fig. 3 is a plan view thereof. Fig. 4 is a perspective view of the skeleton structure within the casing. Fig. 5 is an enlarged longitudinal section, and Fig. 6 an enlarged horizontal section through the two parts of this device assembled; and Fig. 7 is an enlarged cross section taken on about the line 7—7 of Fig. 6.

This device is made in two parts, each preferably of tin, sheet-metal, or other suitable material although I do not wish to be limited in this respect. Also I reserve the widest latitude as to its size and proportions, and therefore the following specification may be said to describe the essential features only.

The casing 1 is a rectangular box preferably having handles 2 at its top by which it may be lifted, and its open front end is closed by a door 3 hinged to the body at 4 and itself having a handle 5, this door being held closed by a latch 6.

Within the casing is removably disposed a skeleton structure or framework best seen in Fig. 4, and which by preference comprises upright corners 10 of U-shaped cross section arranged in pairs at the front and rear ends of the device and inclosing outwardly projecting flanges 11 at the front and rear ends of the sides 12, the corner-elements being secured to the flanges by any suitable means such as indentations or rivets so that in effect they simply reinforce the flanges and constitute parts thereof. These composite flanges are spaced a suitable distance apart to permit the entire structure to slide into the casing as seen in Fig. 6, and the pairs of flanges are spaced a suitable distance apart to occupy substantially the full length of the casing as also seen in that view. The lower edges of the sides are connected by transverse straps 13 at the front and rear ends of the device, the ends of said straps overlying and riveted to inturned flanges 14 at the lower edges of the sides; and the space between these flanges and between the straps leaves the bottom open as at 15. The upper edges of the sides are carried inward and bent into W-shape as best seen in Fig. 7; and by preference the top 16 thus formed is integral with the upper edges of said sides for economy in metal and in cost of manufacture. The apexes of the two W-shaped channels 17 thus formed have rows of openings or perforations 18, and if desired other holes 19 may be formed in the inner leaves of the two folds constituting said V-shaped top. At each end of the top the metal constituting the various folds of which it is composed is bent upward into flanges 20 which overlap and are secured to each other thus forming ends to the channels 17 for a purpose to appear.

For supporting the basting or roasting pan P as seen in Fig. 7, two slides are provided along the inner faces of the side walls 12, and these are preferably made by giving said walls an inward projection as seen at 21, the slides thus produced being opposite each other and disposed some distance above the bottom of the structure. For lifting the latter a handle member 22 is provided, the same passing across the top and down the outer faces of the sides 12, and having its lower ends turned inward into the crack 23 produced by forming the folded projection 21 just referred to. The thickness of this handle will of course be somewhat less than the distance the corners or flanges 10—11 project beyond the sides, and the operator may insert her finger under the handle and within the gutters or channels 17 when this structure is to be lifted.

In use, the turkey or other object to be roasted is placed in the pan P, and the latter pushed into the skeleton structure on the projections or slides 21 as seen in Fig. 7.

The entire structure is then passed into the casing 1 as seen in Fig. 5, and the door closed. The device is now lifted by means of its handles 2 and placed on the stove-top over an open griddle hole or over a gas burner, and the heat therefrom does the roasting in a well known manner. The water in the pan or the juices from the turkey itself are converted into steam which rises within the skeleton structure, passes out the ends thereof and upward through the holes 19, and finally comes into contact with the cooler top of the casing which condenses the same so that it falls into the channels 17 and runs through the perforations 18 back onto the turkey, so that the same is thereby automatically basted. This principle of self-basting is well-known in devices of this character, but the present invention lies more in the structure of parts than in the broad idea.

What is claimed as new is:

1. In a device of the class described, the combination with a casing; of a skeleton structure removably inserted therein and comprising two upright sides, a corrugated top connecting them and having perforations in its channels, out-turned flanges at the ends of said sides and inturned flanges along their lower edges, cross strips connecting the last-named flanges and leaving the bottom of the structure open, means within said sides for supporting a pan, and upright U-shaped members secured around the upright flanges on said sides and spaced a sufficient distance to permit their passage into said casing.

2. In a a self-basting roaster, the combination with a rectangular casing having a door at its front end; of a skeleton structure having upright sides with outturned upright flanges at their ends adapted to pass into said casing, each side having an inwardly projecting double fold near its lower edge producing a pan-slide, a longitudinally corrugated top connecting the upper edges of said sides and perforated along its channels and having holes in its inner folds, upturned flanges at the ends of all folds of said top forming ends to said channels, and a handle extending across the top and down the sides and with its extremities turned into the crack produced by said inward projections, the whole substantially as described.

In testimony whereof I have hereunto set my hand in presence of two subscribing witnesses.

WALTER A. STORK.

Witnesses:
 A. C. POHLMAN,
 THOS. B. ESTEP.

---

Copies of this patent may be obtained for five cents each, by addressing the "Commissioner of Patents, Washington, D. C."